(12) United States Patent
Rohde et al.

(10) Patent No.: US 12,506,142 B2
(45) Date of Patent: Dec. 23, 2025

(54) PROCESS FOR THE PURIFICATION OF LITHIUM SALTS

(71) Applicant: BASF SE, Ludwigshafen am Rhein (DE)

(72) Inventors: Wolfgang Rohde, Ludwigshafen (DE); Regina Vogelsang, Ludwigshafen (DE); Kerstin Schierle-Arndt, Ludwigshafen (DE); Mattias Voges, Ludwigshafen (DE); Birgit Gerke, Ludwigshafen (DE); Anne-Marie Caroline Zieschang, Ludwigshafen (DE); Matthias Rauls, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 707 days.

(21) Appl. No.: 17/756,059

(22) PCT Filed: Nov. 17, 2020

(86) PCT No.: PCT/EP2020/082442
§ 371 (c)(1),
(2) Date: May 16, 2022

(87) PCT Pub. No.: WO2021/099333
PCT Pub. Date: May 27, 2021

(65) Prior Publication Data
US 2022/0402773 A1    Dec. 22, 2022

(30) Foreign Application Priority Data
Nov. 19, 2019    (EP) .................................... 19210038

(51) Int. Cl.
*H01M 4/36* (2006.01)
*B01D 9/00* (2006.01)
(Continued)

(52) U.S. Cl.
CPC .......... *H01M 4/366* (2013.01); *B01D 9/0054* (2013.01); *B01D 11/0288* (2013.01);
(Continued)

(58) Field of Classification Search
CPC ...................................................... H01M 4/366
See application file for complete search history.

(56) References Cited

U.S. PATENT DOCUMENTS 10,741,872 B2 *   8/2020   You ...................... H01M 4/1393
10,763,503 B2 *   9/2020   Park ...................... H01M 4/366
(Continued)

FOREIGN PATENT DOCUMENTS

CN    108611497 A         10/2018
CN    111313003 A    *    6/2020    ........ H01M 10/0525
(Continued)

OTHER PUBLICATIONS

International Search Report dated Feb. 17, 2021, PCT/EP2020/082442.
(Continued)

*Primary Examiner* — Amanda C. Walke
(74) *Attorney, Agent, or Firm* — Armstrong Teasdale LLP

(57) ABSTRACT

A process for the recovery of lithium from waste lithium ion batteries or parts thereof is disclosed. The process comprising the steps of A) providing a crude lithium hydroxide as a solid, which contains fluoride; and (B) dissolving the crude lithium hydroxide solid with a lower alcohol such as methanol or ethanol provides good separation of lithium in high purity.

11 Claims, 4 Drawing Sheets

(51) Int. Cl.
- *B01D 11/02* (2006.01)
- *C01G 53/50* (2025.01)
- *C22B 7/00* (2006.01)
- *C22B 26/12* (2006.01)
- *H01M 4/48* (2010.01)
- *H01M 4/505* (2010.01)
- *H01M 4/525* (2010.01)
- *H01M 4/62* (2006.01)
- *H01M 10/0525* (2010.01)
- *H01M 10/54* (2006.01)
- *H01M 4/02* (2006.01)

(52) U.S. Cl.
CPC .............. *C01G 53/50* (2013.01); *C22B 7/006* (2013.01); *C22B 26/12* (2013.01); *H01M 4/483* (2013.01); *H01M 4/505* (2013.01); *H01M 4/525* (2013.01); *H01M 4/625* (2013.01); *H01M 10/0525* (2013.01); *H01M 10/54* (2013.01); *C01P 2002/72* (2013.01); *C01P 2004/51* (2013.01); *C01P 2006/80* (2013.01); *H01M 2004/021* (2013.01); *H01M 2004/028* (2013.01)

(56) References Cited

U.S. PATENT DOCUMENTS

| | | | |
|---|---|---|---|
| 11,444,281 B2 * | 9/2022 | Yun | ........................ H01M 4/366 |
| 2011/0147679 A1 | 6/2011 | Inukai et al. | |
| 2020/0358076 A1 * | 11/2020 | Shi | ................... H01M 10/0525 |

FOREIGN PATENT DOCUMENTS

| | | | |
|---|---|---|---|
| EP | 0 613 198 A1 | 8/1994 | |
| EP | 3632851 A1 * | 4/2020 | ............ C01G 51/04 |
| JP | 2012106874 A | 6/2012 | |
| JP | 2012 229481 A | 11/2012 | |
| RU | 2092449 C1 | 10/1997 | |
| RU | 2267461 C2 | 1/2006 | |
| WO | WO 2008/022414 A1 | 2/2008 | |

OTHER PUBLICATIONS

Taboada et al., "Process Design for Drowning-Out Crystallization of Lithium Hydroxide Monohydrate," Elseiver, vol. 85, No. 9, pp. 1325-1330, Jan. 2007.

* cited by examiner

PROCESS FOR THE PURIFICATION OF LITHIUM SALTS

This application is a national stage filing under 35 U.S.C. § 371 of International Application No. PCT/EP2020/082442, filed on Nov. 17, 2020, which claims the benefit of priority to European Application No. 19210038.6, filed on Nov. 19, 2019; the disclosure of each of these applications are each incorporated herein by reference in its entirety.

The present invention is directed towards a process for the recovery of high purity lithium hydroxide from lithium containing resources that also contain fluoride ions. Such resources may be geogenic like for example the lithium mineral Lepidolite, or anthropogenic like waste lithium ion batteries containing at least one transition metal selected from the group consisting of nickel, manganese and cobalt.

For the extraction of lithium, lepidolite mineral typically is calcined with limestone; from solutions of the material containing lithium hydroxide and lithium fluoride, most lithium fluoride can be removed after concentration and filtration. The resulting filtrate may still contain low amounts of fluoride determined by the solution equilibrium.

A similar situation may occur in the recycling of lithium ion batteries where also lithium and fluoride containing solutions can be obtained during the recycling process. The present process for the purification of LiOH specifically pertains to the separation of lithium hydroxide from undesired impurities such as fluoride salts, by extracting lithium from a raw preparation of lithium hydroxide with a liquid comprising or consisting of certain organic solvents such as methanol.

Several processes have been described leading from waste lithium battery materials, such as whole batteries discharged and shredded, or further dismantled and/or mechanically separated, to a material preferentially consisting of one or more lithium salts, suggesting that such salts may be further used for preparing new lithium ion batteries or electrode materials thereof. WO2018223193 describes a process wherein lithium is precipitated as $Li_2CO_3$ after previous separation of Ni, Cu and Mn by ion exchange and Co by precipitation. CN107017443A proposes a similar process optionally with direct solidification of the lithium hydroxide product. KR101998691B proposes a process to obtain a lithium precursor such as LiOH from lithium ion battery electrode material.

A problem arising during recovery of the valuable constituents from battery scrap is the presence of impurities, especially fluoride stemming from the electrolyte or binder material.

It has now been found that the purification of a raw lithium hydroxide containing LiF and/or salts of amphoteric elements may efficiently be accomplished by dissolving such material in a lower alcohol, or in a mixture of solvents based on a lower alcohol.

Present process thus relates to the purification of a raw lithium hydroxide, as typically obtainable from mining solutions or from a material comprising waste lithium ion batteries or parts thereof, which process comprises the steps of (A) providing a crude lithium hydroxide as a solid, which contains fluoride; and
(B) combining the crude lithium hydroxide provided in step (A) with a lower alcohol.

Crude lithium hydroxide may be provided in step (A) as a single phase solid or as a mixture of solid phases. While presence of a liquid is possible, a preferred process provides the crude lithium hydroxide as a dry solid, in the absence of a liquid phase. As no purification is necessary in this step, the crude lithium hydroxide can be dried in a dryer e.g. paddle dryer, spray dryer, spin flash dryer, fluidized bed dryer, riser or rotary kiln. Depending on the drying temperature lithium hydroxide monohydrate or lithium hydroxide anhydrate or any mixture of both is obtained and thus provided in present step (A). Still, the crude lithium hydroxide solid may still contain solvent residues, for example water in an amount exceeding the crystal water resulting from lithium hydroxide monohydrate, typically up to about 5% by the total weight of the solid.

Crude lithium hydroxide provided in step (A) contains fluoride as impurity, typically comprising lithium hydroxide monohydrate containing 100 ppm to 1.29% of calcium, 0.1 to 1.29% of fluorine, 0.1 to 1.29% of sodium; or anhydrous lithium hydroxide containing 175 ppm to 2.26% of calcium, 0.175 to 2.26% of fluorine, 0.175 to 2.26% of sodium; where all amounts are by weight of the dry solid; in an important embodiment, the amount of fluoride is 500 ppm or more relative to the total weight of the crude lithium hydroxide solid.

Said crude lithium hydroxide provided in step (A) often contains one or more further impurities from the group of alkaline salts, aluminum salts, zinc salts; the sum of alkaline, aluminum and zinc typically amounts to 100 to 500 ppm or more, e.g. 500 to 5000 ppm, relative to the total weight of the crude lithium hydroxide solid.

In a typical process of the invention, 90% b.w. or more of the crude lithium hydroxide solid provided in step (A) consist of anhydrous lithium hydroxide or lithium hydroxide monohydrate or mixtures thereof.

The lower alcohol is generally selected from C1-C4 alcohols or is a mixture of such alcohols, such as methanol and/or ethanol.

The lower alcohol added in present step (B) typically is a technical product which may contain up to about 6% b.w. of water; typically, the lower alcohol product or solvent mixture based on such alcohol consists of 93% b.w. or more lower alcohol. The lower alcohol product thus typically comprises a lower alcohol purity of at least 93% b.w., preferably at least 95% b.w., more preferably at least 98% b.w., and especially at least 99% b.w, the remainders in said product being mainly other alcohols and/or water, while other impurities such as non-alcohol organic solvents may be present up to 1% b.w. of said lower alcohol product or solvent mixture based on such alcohol. The lower alcohol is preferably methanol, ethanol or a mixture thereof.

There is a linear impact of the applied alcohol:LiOH ratio in step (B) on the final fluoride content. This is due to the rather low but existing solubility of LiF in the lower alcohol. Therefore, the amount of lower alcohol applied in step (B) should be sufficient to dissolve the crude lithium hydroxide to provide a good overall lithium yield, but should be limited to avoid dissolution of the fluoride and high dilution effects. A typical process combines, for example, about 5 to 15, especially about 7 to 13, molar parts of the lower alcohol such as methanol in step (B) with 1 molar part of lithium provided in step (A).

In a typical process, the combined lithium hydroxide and lower alcohol of step (B) is subsequently mixed to obtain a suspension of solid particles in a solution of lithium hydroxide. The obtained solution containing the dissolved LiOH may subsequently be separated from undissolved impurities by solid-liquid separation (step C) such as filtration, sedimentation, decantation, centrifugation etc. In a preferred process, the solution of lithium hydroxide obtained in step (B) is subsequently subjected to
(C) a solid-liquid separation to obtain a clear solution,
(D) optionally followed by addition of water, and
(F) isolation of lithium hydroxide solid as anhydrate, or as monohydrate, or as mixture of anhydrate and monohydrate, or as mixture of monohydrate with water and/or lower alcohol, or as mixture of anhydrate with lower alcohol.

A further purification may be effected by the additional step of aqueous crystallization, which step is performed before step (A), e.g. by crystallization of a lithium hydroxide containing leach liquor, or after step (B), e.g. after removal of the alcohol and addition of water, with subsequent removal of solids by solid-liquid separation (step C).

Solid lithium hydroxide thus purified may be recovered from the solution using known methods such as crystallization, drowning-out crystallization by addition of less polar solvents e.g. higher alcohols, ethers or hydrocarbons, drying etc.

In specific variant of said preferred process, the solution of lithium hydroxide obtained in step (B) in methanol is subsequently subjected to
(C) a solid-liquid separation to remove undissolved impurities such as LiF and obtain a clear solution,
(D) optionally followed by addition of water,
(E) removal of the solvent to immediately obtain the purified lithium hydroxide (E1); or by crystallization (E2), and
in case that (E2) is carried out, (F) separation of crystals from the liquid, and
(G) drying of the crystals. In such process, solid LiOH is obtained in step (E1) or (F) and (G) anhydrate, or as monohydrate, or as mixture of anhydrate and monohydrate, or as mixture of monohydrate with water and/or lower alcohol, or as mixture of anhydrate with lower alcohol.

The lower alcohol used is advantageously recovered by distillation or evaporation and recycled in the process, e.g. by collecting the solvent from step (E1) or the mother liquor separated in step (F), separate water from lower alcohol where water is present, and reuse in step (B). To avoid a higher alcoholate or alcohol (typically methylate or methanol) content, during alcohol evaporation water can be added, preferably to the end of evaporation (E1) or alternatively during crystallization (E2).

It has been the finding of the present invention, that present process is especially efficient and an especially low fluoride content may be reached when process steps (A), (B) and (C) are carried out with only low amounts of water, or no water at all, present; thus, the crude lithium hydroxide solid provided in present step (A) advantageously contains less than one mol of water per mol of lithium, i.e. below the amount of water present in lithium hydroxyde monohydrate. This can be effected by providing the crude material for step (A) in form of a mixture of the monohydrate and anhydrous lithium hydroxide, e.g. with calculative 90%, or 80%, or especially 50% or less of all LiOH in step (A) present as lithium hydroxide monohydrate besides anhydrous lithium hydroxide (pure LiOH*$H_2O$ contains 16.55 wt.-% of lithium and 42.9 wt.-% of water, while the anhydrate contains 28.99 wt.-% of lithium). Consequently, the amount of water present in the methanol added during step (B) should be kept as low as possible, typically well below quantities able to convert all anhydrate provided in step (A) into the monohydrate, e.g. by using vigorously dried methanol.

In this process variant, water is used prior to step (C) only in less than stoichiometric amounts, or no water at all is used. Thus, water is preferably added in step (D), especially in amounts reducing the formation of alcoholate during subsequent drying steps to less than 5 mol-%, preferably less than 1 mol-% of the total lithium in the dry product. In an example for such preferred process, about 1 molar part of water or more is added in step (D) for each mol of lithium provided in step (A), typical are 1 to 5 mol, preferred are 1 to 3 mol, most preferred 1 to 2 mol.

Consequently, in a preferred process, the crude lithium hydroxide solid provided in step (A) comprises 50 mol-% or more of the lithium hydroxide in the form of anhydrate, and water is added (in step D) after step (C) in an amount of 1 to 5 mol, preferred are 1 to 3 mol, most preferred 1 to 2 mol on 1 molar part of lithium.

Typically, the solid lithium hydroxide product obtained in accordance with the present invention (step E, F and/or G) contains a certain amount of residual carbon compounds (total carbon [TC] or especially non-purgeable organic carbon [NPOC] as described below). The residual content, especially of NPOC, is typically from the range 1 to 5000 ppm, especially 1 to 3000 ppm, of the total mass of the solid product obtained in the process described above. Such residual NPOC is determined as described further below. Examples of NPOC are remainders of the lower alcohol, especially methanol, used in present step (B), or elementary carbon (graphite, for example, is detected as NPOC); minor amounts of lithium alcoholate such as LiOCH3 may also be present, but are preferably avoided due to handling and storage problems, especially when the amount of alcoholate in the product is above 5 mol-% of the lithium, or even 1 mol-%.

The solid lithium hydroxide product thus obtained typically contains at least 50% by weight of LiOH, often with presence of water e.g. as lithium hydroxide monohydrate.

Preferred is a solid lithium hydroxide product comprising 1 to 100 ppm of fluoride and 1 to 1000 ppm, especially 5 to 500 ppm, of said lower alcohol such as ethanol or especially methanol, each based on the total weight of the solid product.

The crude lithium hydroxide provided in step (A), e.g. with impurity levels as described above, is typically obtained from lithium ion battery scrap material.

Basically, all solutions containing lithium and fluoride ions in dissolved form may be used as a source for the present crude lithium hydroxide solid of present step (A), which is obtainable after removal of at least a part of the solvent; in a typical process, present crude lithium hydroxide solid provided in step (A) is obtained by drying and/or crystallization, optionally after separation of solids from the solution. The crude lithium hydroxide provided in step (A) may be obtained from leaching a material containing lithium hydroxide, it may be also obtained from a chemical or electrochemical transformation of a suitable starting material. So, the starting material may be a fluoride containing lithium salt other than hydroxide (e.g. bicarbonate/carbonate, chloride, nitrate or sulfate). From such salts the raw lithium hydroxide may be obtained e.g. by reaction with a alkaline earth hydroxide or by electrolysis or electrodialysis or by calcination (lithium nitrate) and subsequent hydrolysis.

For obtaining the crude Li hydroxide, the material obtained from battery scrap typically is subsequently subjected to the steps of reduction, aqueous leaching optionally in presence of an alkaline earth hydroxide (preferably calcium hydroxide), separation of solids, and drying and/or crystallization.

The invention thus further pertains to a process for the recovery of lithium from a material comprising waste lithium ion batteries or parts thereof, which process comprises, prior to present steps (A) and (B), the steps of:
  (a) providing a reduced particulate material containing a transition metal compound and/or transition metal, wherein the transition metal is selected from the group consisting of Mn, Ni and Co, which particulate material further contains a lithium salt and a fluoride salt, and which particulate material optionally contains calcium;
  (b) treating the material provided in step (a) with a polar solvent; and
  (c) separating the solids from the liquid, optionally followed by washing the solid residue.

Typically, said lithium containing transition metal oxide material is obtained after mechanic removal of casing, wiring or circuitry, thus typically consisting mainly of the cell material. For safety reasons, such lithium ion batteries are discharged completely, e.g. by immersion in a dry conductive bath such as metal shreds, otherwise, shortcuts may occur that constitute fire and explosion hazards. Such lithium ion batteries may be disassembled, punched, milled, for example in a hammer mill, or shredded, for example in an industrial shredder.

It may be advantageous to at least partially remove electrolytes before subjecting the material to the preliminary step (i), especially electrolytes that comprise an organic solvent or a mixture of organic solvents, for example by drying, for example at temperatures in the range of from 50 to 250° C. under atmospheric pressure or below. The lithium containing transition metal oxide material is preferably not exposed to higher temperatures (especially not to 400° C. or more) under oxidizing conditions before subjecting it to present step (a).

In one embodiment of the present invention, said lithium containing transition metal oxide material is from battery scraps. In a preferred embodiment of the present invention, said lithium containing transition metal oxide material is from mechanically treated battery scraps, for example from battery scraps treated in a hammer mill or in an industrial shredder.

The particulate material provided in step (a) typically comprises material obtained from waste lithium ion batteries after carrying out the preliminary step of heating under inert or reducing conditions to a temperature from the range 80 to 900° C., which reduction is typically carried out after discharging the lithium ion batteries, dismantling and/or shredding. Reduction is advantageously conducted under conditions comprising the presence of carbon and a reducing gas selected from hydrogen and carbon monoxide. The temperature during such reduction step is preferably from the range 200 to 800° C., more preferably from the range 350 to 500° C., especially 350 to 450° C. In an important embodiment, reduction is conducted in the presence of 35% or more by volume of hydrogen, preferably 50 to 100%, by volume (normal conditions) of hydrogen, the rest, if present, being a non-oxidizing gas. In said embodiment of the present invention, this reduction step has a duration from the range 10 minutes to 30 hours, preferably 20 min to 8 hours, more preferably 30 min to 4 hours. Of special technical interest is a duration of the reduction step from 20 to 90 minutes, especially 30-60 minutes, with presence of hydrogen as preferred. The concentration of hydrogen in the reduction atmosphere and the reaction time are dependent on each other. Usually a low concentration of hydrogen requires longer reduction times and vice versa.

In a further important embodiment, reduction is conducted by heating under initial presence of oxygen and carbon in a closed furnace with formation of carbon monoxide. The lithium ion batteries used, and thus the particulate material provided in step (a), typically contains carbon, e.g. in the form of graphite.

In one embodiment, the reduction conditions related to the hydrogen and/or carbon monoxide concentration, and the temperature and duration are chosen that at least a part of the resulting lithium containing transition metal oxide material contains para-, anti-ferro-, ferro- and/or ferri-magnetic components. Preferred is the formation of ferro- or ferrimagnetic components resulting from the at least partial reduction of the lithium containing transition metal material. The extend of the reduction may vary in the range between 1 to 100% with respect to the nickel contained in the lithium containing transition metal material; preferred is a range from 80 to 100%.

The particulate material provided in present step (a) thus contains a transition metal compound and/or transition metal, wherein the transition metal is selected from the group consisting of Mn, Ni and/or Co, and wherein further at least a fraction of said Ni and/or Co, if present, are in an oxidation state lower than +2, and at least a fraction of said Mn, if present, is manganese(II)oxide; nickel and/or cobalt therein are typically at least in part present in their metallic state.

In the following, the particulate material of this embodiment provided in step (a), as well as the material subjected to the preliminary reduction step, will alternatively be summarized as lithium containing transition metal oxide material. Typically, such lithium containing transition metal oxide material stems from lithium ion batteries and contains fluorine preferably in the range from 1% to 8% by weight, and/or phosphorous in the range from 0.2% to 2% by weight, relative to the weight of the lithium containing transition metal oxide material.

As a result of the reduction treatment of the particulate material prior to the above step (a), at least a fraction of said Ni and/or Co, if present, are in an oxidation state lower than +2, and at least a fraction of said Mn, if present, is manganese(II)oxide.

The transition metal compound and/or transition metal Ni and/or Co in oxidation state lower than +2, contained in the particulate material provided in step (a), mostly comprises Ni and/or Co in the metallic state, as detectable by powder x-ray diffractometry (Cu-k-alpha-1 radiation). The lithium salt and the fluoride salt contained in the particulate material provided in step (a) typically comprises one or more salts selected from LiOH, LiF, Li2O, Li2CO3, LiHCO3, lithium aluminates, lithium phosphate salts, mixed oxides of Li and one or more of Ni, Co, Mn, Fe, Al, Cu and/or fluorides of Ni, Co, Mn, Fe, Al, Cu.

Since strong heating, especially under oxidative conditions, but to a lesser extent also under reductive atmosphere, tends to increase formation of insoluble species (such as $LiMnO_2$), it is preferred to generally expose the lithium containing transition metal oxide material not to temperatures of 500° C. or more. Thus, the particulate material provided in step (a) preferably is not exposed to temperatures of 400° C. or more under oxidizing conditions before subjecting it to present step (a).

In one embodiment of the present invention, the material provided in step (a) is subjected to a dry solid-solid separation prior to step (b) to separate the transition metal containing components.

In a typical embodiment of the present invention, said lithium containing transition metal oxide material provided in step (a) contains in the range of from 20 ppm to 10%, especially 20 ppm to 3%, by weight of copper, as metal or in form of one or more of its compounds.

In a typical embodiment of the present invention, said lithium containing transition metal oxide material provided in step (a) contains in the range of from 100 ppm to 15% by weight of aluminum, as metal or in form of one or more of its compounds.

In a typical embodiment of the present invention, said lithium containing transition metal oxide material provided in step (a) contains in the range of from 100 ppm to 5% by weight of iron, as metal or alloy or in form of one or more of its compounds.

In a typical embodiment of the present invention, said lithium containing transition metal oxide material provided in step (a) contains in the range of from 20 ppm to 2% by weight of zinc, as metal or alloy or in form of one or more of its compounds.

In a typical embodiment of the present invention, said lithium containing transition metal oxide material provided in step (a) contains in the range of from 20 ppm to 2% by weight of zirconium, as metal or alloy or in form of one or more of its compounds.

In a typical embodiment of the present invention, said lithium containing transition metal oxide material provided in step (a) contains in the range of from 1% to 8%, especially 2% to 8%, by weight of fluorine, calculated as a sum of organic fluorine, e.g., bound in polymers, and inorganic fluoride in one or more of its inorganic fluorides.

In a typical embodiment of the present invention, said lithium containing transition metal oxide material provided in step (a) contains in the range of from 0.2% to 2% by weight of phosphorus. Phosphorus may occur in one or more inorganic compounds.

Each of the percentages given above are by weight of the dry material (i.e. lithium containing transition metal oxide material as provided in present step (a)).

Said lithium containing transition metal oxide material contains nickel and cobalt. Examples of lithium containing transition metal oxide materials may be based on lithiated nickel cobalt manganese oxide ("NCM") or on lithiated nickel cobalt aluminum oxide ("NCA") or mixtures thereof.

The preliminary treatment of battery scrap material and/or steps (a) to (c) may be carried out in accordance with JP2012229481: Waste batteries thus may be treated in one or more steps to bind the fluorine contained in the conducting electrolyte salt, usually LiPF6, and the binder polymer, usually polyvinylidene fluoride (PVDF). This may be achieved by treating the waste batteries with aqueous calcium hydroxide (slaked lime) solution to hydrolyze the conducting salt and precipitate fluoride as calcium fluoride. JP 2012-229481 discloses a process for the recovery of metals from spent lithium ion batteries comprising a preliminary immersion step followed by high temperature oxidation, reductive roasting, aqueous treatment with filtration, subsequent conversion of lithium hydroxide by carbonation, and recovery of lithium as carbonate. Present process does not require such carbonation.

The material provided in step (a) is typically ground prior to step (b) in order to de-agglomerate different solid particles from one another in cases that these are somehow agglomerated, for example by residual binder polymers. The grinding can be performed under dry or wet conditions. Preferably the grinding is done in an aqueous medium that is also employed in the consecutive step (b).

The particulate material provided in step (a) as obtained from waste lithium ion batteries, especially the cell materials thereof, is advantageously provided in the form of a dry powder, wet powder or suspension of particles in a liquid; comprised particles typically have an average particle diameter D50 from the range 1 µm to 2 mm when detected in accordance with ISO 13320 EN:2009-10.

The polar solvent used in step (b), and optionally for washing the solid residue in step (c), typically is selected from water, alcohols, ketones, esters, organic carbonates, polyethers, nitriles, and mixtures thereof capable to dissolve calcium hydroxide as good as water or even better. Examples of such solvents are polyols like glycol, glycerol or polyethylene glycols, and mixtures thereof. The polar solvent may be a protic solvent, such as water, alcohols, and mixtures thereof. Aqueous medium primarily is water or mixtures of water with one or more alcohols. The polar solvent is preferably water or an aqueous solution; the aqueous solution generally comprises cations of metals mentioned above as well as further metals typically contained in battery scrap materials or lithium minerals such as Al, Zn, alkali etc., as hydroxides and/or salts.

Step (b) is preferably carried out with an alkaline earth hydroxide present. The alkaline earth hydroxide is generally selected from hydroxides of Mg, Ca, Sr and Ba; preferred are calcium hydroxide, barium hydroxide and mixtures thereof; most preferred is calcium hydroxide. The alkaline earth hydroxide used in present step (b) may be used as such, or may be added in form of the oxide, or mixture of oxide and hydroxide, to form the alkaline earth hydroxide upon contact with a polar solvent selected from protic solvents noted above. The treatment is typically carried out by combining an amount of alkaline earth hydroxide (AEH) with the particulate material (PM), which corresponds to at least 5%, and typically not more than 100%, of its weight, e.g 50-1000 g of AEH on 1 kg of PM, preferably 100-1000 g AEH, more preferably 200-1000 g AEH on 1 kg of PM. The amount of polar solvent is typically chosen to ensure miscibility of the components, e.g. using the polar solvent in a quantity exceeding the combined weight amounts of PM and EH by the factor of 2 to 20, preferably about 3 to 10.

Step (b) primarily provides a suspension of the particulate material in the polar solvent; it is preferably carried out with heating, typically at temperatures from the range 60 to 200° C., preferably 70 to 150° C. Where the boiling point of the polar solvent is exceeded, the treatment is carried out under pressure to hold the solvent, or at least a fraction thereof, in the liquid state. Of special technical importance is the temperature range around the boiling point of water, i.e. about 70 to 150° C., where the treatment can be achieved using an aqueous liquid or water at normal pressure or slightly elevated pressure (e.g. up to 5 bar). Alternatively, present step (b) can be carried out with application of higher temperatures and pressures, e.g. 150 to 300° C. and 1.5 to 100 bar.

In one embodiment of the present invention, step (b) is carried out in a vessel that is protected against strong bases, for example molybdenum and copper rich steel alloys, nickel-based alloys, duplex stainless steel or glass-lined or enamel or titanium coated steel. Further ex-amples are polymer liners and polymer vessels from base-resistant polymers, for example poly-ethylene such as HDPE and UHMPE, fluorinated polyethylene, perfluoroalkoxy alkanes ("PFA"), polytetrafluoroethylene ("PTFE"), PVdF and FEP. FEP stands for fluorinated ethylene propylene polymer, a copolymer from tetrafluoroethylene and hexafluoropropylene.

The treatment is typically done using a mixing device, e.g. a stirrer, with power application typically up tp 10 W per kg of suspension, e.g. 0.5 to 10 W/kg, or cycled by pumping in order to achieve a good mixing and to avoid settling of insoluble components. Shearing can be further improved by employing baffles. Furthermore, the slurry obtained from step (b) may advantageously be subjected to a grinding treatment, for example in a ball mill or stirred ball mill; such grinding treatment may lead to a better access of the polar solvent to a particulate lithium containing transition metal oxide material. Shearing and milling devices applied typically are sufficiently corrosion resistant; they may be produced from similar materials and coatings as described above for the vessel.

In one embodiment of the present invention, step (b) has a duration in the range of from 20 minutes to 24 hours, preferably 1 to 10 hours.

In one embodiment step (b) is performed at least twice to reach an optimum recovery of lithium hydroxide or the lithium salt. Between each treatment a solid-liquid separation is performed. The obtained lithium salt solutions may be combined or treated separately to recover the solid lithium salts.

In one embodiment of the present invention, the polar solvent in present step (b) is an aqueous medium, and the ratio of the aqueous medium to material provided in step (a) is in the range of from 1:1 to 99:1, preferably 5:1 to 20:1 by weight.

At the end of step (b), the pressure may be released if applicable. An aqueous solution containing LiOH is obtained.

In an important embodiment of the invention, prior to present steps (A) and (B), the steps (a) to (c) are carried out in the way as follows:
  (a) providing a particulate material containing a transition metal compound and/or transition metal, wherein the transition metal is selected from the group consisting of Mn, Ni and Co, and wherein further at least a fraction of said Ni and/or Co, if present, are in an oxidation state lower than +2, and at least a fraction of said Mn, if present, is manganese(II)oxide; which particulate material further contains a lithium salt and a fluoride salt, and which particulate material optionally contains calcium provided that the element ratio calcium to fluorine is 1.7 or less or is zero;
  (b) treating the material provided in step (a) with a polar solvent and an alkaline earth hydroxide; and
  (c) separating the solids from the liquid, optionally followed by washing the solid residue with a polar solvent such as water.

Crude lithium hydroxide solid as provided in present step (A) may be obtained after removal of the polar solvent, or parts of that solvent, from the liquid obtained in step (c), or after further treatment as described below (optional steps d, e, e1, e2, e3).

In one embodiment of the present invention, the solid material obtained from step (c) is subjected to the additional step (d) of a solid-solid separation. The material is advantageously ground prior to step (d) in order to liberate the different solid particles from one another in cases that these are somehow agglomerated for example by residual binder polymers. Such grinding is preferably performed in ball mills or stirred ball mills.

In one embodiment of the present invention, step (d) is a wet solid-solid separation employing an aqueous medium preferably water as fluid. The ratio of the fluid medium to solid material obtained in step (b) is in the range of from 1:1 to 99:1, preferably 2:1 to 9:1 by weight.

From the wet solid-solid separation of step (d) result two slurries one containing the target transition metal containing solid material and one that contains the other components like carbonaceous materials and polymers and if applicable also some inorganic compounds. By suitable selection and if necessary combination of solid-solid separation steps at least 60% of the Ni and, if present, Co is obtained and concentrated in one fraction. Preferably at least 80 to 99% of the Ni and, if present, Co is separated.

In one embodiment of the present invention the liquid phase of the slurry fed to step (d) contains dissolved lithium. In this case one or the other or both slurries obtained from the solid-solid separation in step (d) are subjected to a solid-liquid separation in order to recover the lithium solution. The lithium solution is then further treated in step (e).

In step (e), the solution obtained from any of the foregoing steps, which contains lithium, is treated to recover the lithium as hydroxide or salts in form of solid materials.

In one embodiment of the present invention the Li-salts, especially LiOH, are recovered by evaporation of the water contained in the solution (e1). In order to produce the desired Li-salt of high purity, this evaporation may be carried out in two consecutive steps (e2 and e3) with a solid-liquid separation between the steps e2 and e3 to remove undissolved solids. In step e3 the solution is either dried or lithium hydroxide is obtained by crystallization or drowning-out crystallization; the latter by addition of a higher alcohol or another component of low polarity but sufficient miscibility with water e.g. ethers etc. In a preferred embodiment, steps (e), (e1), (e2) and (e3) are performed in an inert atmosphere, e.g. under nitrogen or argon.

The two consecutive steps may comprise:

Firstly, the Li containing solution from any of the foregoing steps is concentrated to a level just below the solubility limit of LiOH, typically the Li-concentration will be at least 5% less than the corresponding saturation concentration of LiOH. This step is accompanied by a solid formation (e.g. crystallization) of im-purities having lower solubilities than LiOH; potential impurities can be but are not limited to $Ca(OH)_2$, $CaF_2$, $CaCO_3$, LiF. These are separated by a solid-liquid separation, e.g. by filtration or centrifugation or a kind of sedimentation and decantation. Since the amount of solids to be sepa-rated is small, preferably depth filters are applied. For the case that LiF is precipitated during this first concentration step (e2), it is preferred to re-feed the solid material to step (b).

Secondly, the filtrate obtained from solid-liquid separation after one of the concentration steps, i.e. the concentrated LiOH solution, is used in the next evaporation step. LiOH of high quality can be obtained by evaporating the remaining water and a solid formation of LiOH. In case of crystallization, the crystals are separated from the remaining mother liquor, again, by solid liquid separation and are optionally washed.

For all the above-mentioned solidification steps subsequent drying of the solids is advantageous to obtain the crude lithium hydroxide solid for present step (A). Drying either below 60° C. or at higher temperatures under high humidity conditions leads to LiOH monohydrate; otherwise, at least partially water free LiOH is obtained.

In case that the filtrate obtained after step (c) is dried by total evaporation of the polar solvent, e.g. water, according to described step (e1), a crude LiOH solid useful for present step (A) may be obtained, which may in a range of 90 to 99% b.w. purity, typically of about 98% b.w. purity when dried. Next to carbon-based impurities (typically <0.5 wt.-%) it may contain an impurity spectrum characteristic for the above described process.

Referring to LiOH monohydrate thus obtained, characteristic impurities typically are calcium, fluorine and sodium. Their typical amounts within this LiOH monohydrate are:

Ca: 100 ppm-1.29 wt.-%
F: 0.1-1.29 wt.-%
Na: 0.1-1.29 wt.-%

Furthermore, it is possible, depending on the composition of the starting material, that significant amounts of zinc, aluminum, potassium and chlorine are present. In these cases, their characteristic amounts in an above described LiOH monohydrate obtainable after step (e1) often are within the following ranges:

Zn: 20 ppm-1.29 wt.-%
Al: 50 ppm-1.29 wt.-%
K: 0.1-1.29 wt.-%
Cl: 0.1-1.29 wt.-%

Depending on the drying conditions, anhydrous LiOH instead of the monohydrate is obtained. In this case, the above-mentioned characteristic amounts of impurities, which are related to the monohydrate, are higher concentrated, respectively, by a factor of 1.75 (corresponds to the molar weight of the monohydrate divided by the molar weight of the anhydrate) for 100% water free LiOH.

All steps applied including steps (b), (c), (d) and (e) are preferably carried out in inert atmosphere, e.g. nitrogen, argon, or in CO2 free air.

A typical embodiment can be described as follows:

A residue obtained from battery scrap material containing lithium, fluoride and metallic cobalt and/or nickel is provided (step a) and is stirred with water to which calcium hydroxide has been added in an amount sufficient to bind all fluoride contained in the material (step b). The slurry is filtered (step c) to separate not dissolved solids (such as cobalt and/or nickel metal, calcium fluoride, carbon).

The leach liquor contains the majority of the lithium contained in the feed material dissolved as LiOH (main lithium salt). Now this leach liquor is concentrated by evaporating water to a LiOH concentration low enough that no LiOH will precipitate (step e2; i.e. less than 12 g LiOH/100 g water), and any remaining less soluble material precipitating is separated.

Traces of metal cations in the solution obtained e.g. in step b, c and/or e2 can be removed by various techniques in accordance with the state of the art. Typical techniques are
i) Precipitation and subsequent separation in step c or e2 of insoluble metal sulfides upon addition of a sulfide source, e.g. Na2S, NaHS, Li2S, LiHS or H2S of which the latter two are preferred, or mixtures of at least two of the mentioned sulfide sources.
ii) Crystallization in aqueous solution after any of steps c or e2, either in form of a one-step crystallization or in form of a fractionated crystallization with two or more steps or continuously. Crystallization is preferred in cases when impurities of high solubility are present, e.g. Na or K originating from NaOH, NaCl, KOH or KCl; besides these cations, even the chloride content can be significantly reduced by crystallization in an aqueous solution.
iii) Solvent extraction after any of steps c or e2.

Any precipitate is finally separated by solid-liquid separation, e.g. by filtration.

The liquid containing lithium hydroxide, as obtainable from any of the foregoing steps c or e2 with or without any of the purification steps (i) to (iii), is finally transformed to the crude solid lithium hydroxide solid either by evaporation of the liquid to dryness or by crystallization or drowning-out crystallization.

The solid residue of crude lithium hydroxide thus provided in step A is then treated with the lower alcohol such as methanol (step B) in a quantity to dissolve any LiOH contained in the solid residue; in a typical process of the invention, the LiOH concentration in the methanol solution thus obtained is 9 g of LiOH in 100 g solution, or lower.

This solution is filtered from any insoluble residue e.g. residual salts based on fluoride, aluminate or zincate (step C).

The methanolic LiOH filtrate is then concentrated to solidify LiOH. The obtained LiOH may be dried to evaporate methanol completely. It may be re-crystallized from water to form hydrated lithium hydroxide such as LiOH*$H_2O$, or the crystallization is directly carried out in a methanol/water mixture. In one embodiment, solid lithium hydroxide is obtained by drowning-out crystallization from the methanolic solution by addition of higher alcohols, ethers and/or hydrocarbons. The lithium hydroxide obtained is of high purity, especially with respect to fluoride ion impurities and also with respect to salts of amphoteric elements like Al, Zn.

For example, the residue obtained from battery scrap material containing fluoride, as provided in step a, is suspended in water and stirred with calcium hydroxide (or calcium oxide that forms calcium hydroxide in water) at a solid content of 5 to 30 w % and in a molar Ca:Li ratio ranging from about 1:3 to 1:1 for a time period typically ranging from 1 h to 8 hours, e.g. under reflux (step b, typically under normal pressure). After cooling to room temperature, the slurry is filtered (step c). The leach liquor is concentrated by evaporating water to a LiOH concentration slightly below 12 g LiOH/100 g water (step e2). Optionally, $Li_2S$ and/or $H_2S$ is added. Precipitates are finally separated by filtration. The remaining liquid is evaporated to dryness (step e3). The residue thus provided (step A) is treated with methanol (step B) to obtain a LiOH concentration in methanol of up to 9% b.w. This solution is filtered from any insoluble residue (step C). The methanolic LiOH filtrate is concentrated to crystallize high purity LiOH.

In a further embodiment, the slurry obtained from the leaching in water of step b in the previous example may be treated with sulfides; then it may be evaporated to dryness (step e3) and subsequently re-dissolved in methanol (step B), by this avoiding multiple filtration steps. The methanolic slurry is then filtered (step C), and from the filtrate a pure LiOH having low fluoride content is isolated.

In the context of the present invention, the content of impurities is often referenced to Lithium hydroxide anhydrate or lithium hydroxide monohydrate. 10 ppm impurity in Lithium hydroxide monohydrate corresponds to 17.5 ppm impurity in Lithium hydroxide anhydrate. The same level of impurity can be related to the Lithium content which helps in case of a anhydrate/monohydrate mixture; 10 ppm impurity in Lithium hydroxide monohydrate as well as 17.5 ppm impurity in Lithium hydroxide anhydrate correspond to 60.4 ppm impurity referenced to the Li content.

Description of Methods:

Particle size distribution measurements, including determination of D50, are performed according to ISO 13320 EN:2009-10.

Elemental analysis of lithium, calcium and manganese (performed inter alia for determining the Li, Ca, Mn content of the particulate material provided in present step (a)): Reagents are deionized water, hydrochloric acid (36%), K2CO3-Na2CO3 mixture (dry), Na2B4O7 (dry), hydrochloric acid 50 vol.-% (1:1 mixture of deionized water and hydrochloric acid (36%)); all reagents are p.a. grade.

Elemental analysis of fluorine and fluoride is performed in accordance with standardized methods: DIN EN 14582:2016-12 with regard to the sample preparation for the overall fluorine content determination (waste samples); the detection method is an ion selective electrode measurement. DIN 38405-D4-2:1985-07 (water samples; digestion of inorganic solids with subsequent acid-supported distillation and fluoride determination using ion selective electrode).

Determination of Carbon and Alcohol Content

Carbon: In addition to organic carbon, samples may contain carbon dioxide or ions of carbonic acid. Depending on the species of interest, the following methods are applied.

Total carbon (TC): A typical analysis for total carbon measures both the total organic carbon (TOC) present and the complementing total inorganic carbon (TIC), the latter representing the amount of non-organic carbon, like carbon in carbonate minerals. This is done by combustion in an oxygen containing atmosphere. A description of this method is part of DIN EN 15936:2012-11 (Verfahren A).

TOC can be determined indirectly (a) and directly (b):
a) Subtracting the inorganic carbon from the total carbon (TC) yields TOC and is described in DIN EN 15936:2012-11 (Verfahren A).
b) Another common variant of TOC analysis involves removing the TIC portion first and then measuring the leftover carbon. This method involves purging an acidified sample with carbon-free air or nitrogen prior to measurement, and so is more accurately called non-purgeable organic carbon (NPOC) since volatile organics are purged as well. NPOC is determined by purging an acidified sample with carbon-free air or nitrogen prior to measurement, followed by combustion in an oxygen containing atmosphere (DIN EN 15936:2012-11, B).

Lower alcohols such as methanol or ethanol are identified and quantified by GC-MS (gas chromatography+mass spectrometry) headspace technique (following ISO 17943:2016) after separating the lower alcohol from the LiOH matrix in an appropriate solvent like water or aqueous hydrochloric acid.

Other metal impurities and phosphorous are determined analogously by elemental analysis using ICP-OES (inductively coupled plasma—optical emission spectroscopy) or ICP-MS (inductively coupled plasma—mass spectrometry). Total carbon is determined with a thermal conductivity detector after combustion.

Phase compositions of solids [including the identification of manganese(II)oxide, and Ni and Co in an oxidation state lower than +2 (typically metallic) in the particulate material provided in present step (a)] are determined with powder x-ray diffraction (PXRD). The method is performed as follows:

The sample is ground to fine powder and filled in the sample holder.

Two devices, each using its specific radiation source, are employed:

(1) Measurement applying Cu radiation: The instrument used is a Bruker D8 Advance Series 2 with an auto-sampling unit; primary side: Cu-anode, beam spread angle aperture 0.1° with ASS; secondary side: Scattered beam aperture 8 mm with Ni 0.5 mm, Soller 4°, Lynx-Eye (3° aperture).

(2) Measurement applying Mo radiation: The instrument used is a Bruker D8 Discover A25 with an auto-sampling unit; primary side: Mo-anode with Johansson monochromator (Mo—K-alpha1) with axial soller 2.5°; secondary side: ASS, Soller 2.5°, Lynx-Eye XE detector (3.77° aperture). References are used to identify matches with the obtained reflection pattern. All relevant phases are well known in the literature; the following references are consulted and used in order to calculate the theoretical diffraction pattern (see position and intensity of re-flections in Table 1 below):

a) $Co_xNi_{1-x}$; space group Fm-3m;
   x=0.5: Taylor et al., J. Inst. Met. (1950) 77, 585-594.
   x=0: Buschow et al.; J. Magn. Magn. Mater. 1983, 38, 1-22.

b) Co; space group $P6_3$/mmc; Buschow et al.; J. Magn. Magn. Mater. 1983, 38, 1-22.

c) Li2CO3, space group C2/c; J. Alloys Compd. (2011), 509, 7915-7921 d) LiAlO2, space group R-3m; Marezio et al., J. Chem. Phys. (1966) 44, 3143-3145.

e) MnO, space group Fm-3m, Locmelis et al., Z. Anorg. Allg. Chem. 1999, 625, 1573.

TABLE 1

Characteristic reflections (position given in °2theta and relative intensity in %) of CoxNi1-x, Co, Li2CO3, LiAlO2 and MnO with intensities >10% and 2theta <80° for Cu K alpha 1 radiation):

| Compound | hkl | 2 theta [%] | rel intensity [%] |
|---|---|---|---|
| $Co_{0.5}Ni_{0.5}$ | 111 | 44.36 | 100 |
| | 200 | 51.68 | 46 |
| | 220 | 76.12 | 24 |
| Ni | 111 | 44.50 | 100 |
| | 200 | 51.84 | 46 |
| | 220 | 76.38 | 24 |
| Co | 100 | 41.74 | 25 |
| | 002 | 44.62 | 27 |
| | 101 | 47.60 | 100 |
| | 102 | 62.74 | 13 |
| | 110 | 76.20 | 14 |
| Li2CO3 | 1 1 0 | 21.24 | 100 |
| | 2 0 0 | 23.30 | 19 |
| | 2 0 −2 | 30.44 | 98 |
| | 0 0 2 | 31.76 | 96 |
| | 1 1 −2 | 34.00 | 83 |
| | 3 1 −1 | 36.72 | 81 |
| | 0 2 1 | 39.44 | 39 |
| | 2 2 −1 | 42.48 | 22 |
| | 3 1 1 | 48.58 | 52 |
| | 4 2 −1 | 57.34 | 11 |
| | 2 2 −3 | 57.90 | 19 |
| | 2 0 −4 | 59.58 | 20 |
| | 5 1 −3 | 62.86 | 12 |
| LiAlO2 | 003 | 18.72 | 100 |
| | 101 | 37.60 | 17 |
| | 104 | 45.22 | 98 |
| | 107 | 59.30 | 17 |
| | 018 | 65.02 | 23 |
| | 110 | 66.76 | 27 |

TABLE 1-continued

Characteristic reflections (position given in °2theta and relative intensity in %) of CoxNi1-x, Co, Li2CO3, LiAlO2 and MnO with intensities >10% and 2theta <80° for Cu K alpha 1 radiation):

| Compound | hkl | 2 theta [%] | rel intensity [%] |
|---|---|---|---|
| MnO | 111 | 34.94 | 60 |
|  | 200 | 40.58 | 100 |
|  | 220 | 58.72 | 58 |
|  | 311 | 70.20 | 23 |
|  | 222 | 73.82 | 17 |

In case of characteristic reflections overlapping with reflections of different crystalline phases (especially graphite, which contributes the largest fraction of the sample), an additional measurement employing an alternative radiation source (e.g. Mo K alpha instead of Cu K alpha) is performed.

Abbreviations

Steps A and B denote the mandatory steps of present process, other steps described are optional and may be advantageous in the context described, such as steps identified with capitol letters (mainly downstream) and steps identified with small letters (mainly upstream). In the context of the present invention, normal pressure means 1 atm or 1013 mbar. "Normal conditions" mean normal pressure and 20° C. Nl stands for normal liter, liter at normal conditions (1 atm, 20° C.). PFA stands for perfluoroalkoxy polymer; MeOH stands for methanol; EtOH stands for ethanol.

Percentages or ppm refer to % or ppm by weight, "in vacuo" denotes reduced pressure from the range 20 to 50 mbar, each unless specifically defined otherwise. The expressions % by weight (% b.w.) and wt % may be used interchangeably. "wppm" stands for weight parts per million; c stands for concentration. Wherever mentioned, the terms "room temperature" and "ambient temperature" denote a temperature between 18 and 25° C. XRD denotes powder x-ray investigation (radiation as indicated, typically Cu k-alpha1 radiation of 154 pm or Mo k-alpha1 of 71 pm).

The invention is further illustrated by the following examples; LiOH content is calculated based on the analytically determined Li content; the water content b.w. can be approximated by subtracting the calculated LiOH content from 100%.

Example 1: Synthetic Educt Sample

An amount of 200 g simulated spent battery scrap containing
78.8 g spent cathode active material containing nickel, cobalt and manganese in similar molar amounts, approximate formula Li(Ni0.34Co0.33Mn0.33)O2,
62.2 of organic carbon in the form of graphite and soot
47.0 g of organic electrolyte mixture (containing LiPF6)
7.4 g polyvinylidene fluoride as binder,
2.4 g aluminum powder,
0.2 g iron powder,
2.0 g copper metal
is placed into a 500-mL quartz round bottom flask and attached to a rotary evaporator in a way that the flask is immersed in an oven. Within 4.5 hours the rotating flask is heated to 800° C. in the course of 2 hours under a flow of argon (20 l/h) and held at this temperature for 1 hour under a flow of dry air (20 l/h) before cooling down to ambient temperature. An amount of 173.3 g heat treated material is obtained comprising a phase composition of Ni/Co-alloy, iron manganese oxide, Li2CO3, LiF, and graphite.

Example 1a: Providing a Reduced Mass from Waste Lithium Ion Batteries

An amount of ~1 t mechanically treated battery scrap containing spent cathode active material containing nickel, cobalt and manganese, organic carbon in the form of graphite and soot and residual electrolyte, and further impurities inter alia comprising fluorine compounds, phosphorous and calcium is treated to obtain a reduced mass according to the process described in Jia Li et al., Journal of Hazardous Materials 302 (2016) 97-104 except that the atmosphere within the roasting system is air whose oxygen reacts with the carbon in the battery scrap to form carbon monoxide, treatment temperature is 800° C.

After reaction and cool down to ambient temperature, the heat-treated material is recovered from the furnace, mechanically treated to obtain a particulate material and analyzed by means of X-ray powder diffraction (FIGS. 1 and 2: Mo Kα radiation, FIGS. 3 and 4: Cu Kα radiation), elemental analysis (Tab. 2) and particle size distribution (Tab. 3).

The Li content is 3.6 wt.-%, which acts as reference for all further leaching examples (see below). Fluorine is mainly represented as inorganic fluoride (88%). Particle sizes are well below 1 mm; D50 is determined to be 17.36 μm.

Comparing the obtained XRD pattern with calculated reference patterns of Ni (which is identical with that one of CoxNi1-x, x=0-0.6), Co, Li2CO3 and LiAlO2 (see reference patterns in Tab. 1), it can be concluded that Ni is exclusively present as metallic phase, either as pure Ni or as an alloy in combination with Co. For clarity, this result is confirmed by applying two different radiation sources. The presence of metallic nickel is supported by the qualitative observation that the whole sample shows typical ferromagnetic behavior when it gets in touch with a permanent magnetic material. As lithium salts, Li2CO3 as well as LiAlO2 are clearly identified by their characteristic diffraction pattern.

The composition of the black powder (PM) obtained is shown in Table 2.

TABLE 2

Composition of reduced black powder (PM)

| F | 2.6 g [i.e. 0.14 mol]/100 g |
|---|---|
| (ionic F thereof) | (2.3 g [i.e. 0.12 mol]/100 g) |
| C (inorganic C thereof) | 31.3 g/100 g (1.2 g/100 g) |
| Ca | 0.16 g [i.e. 0.004 mol]/100 g |
| Co | 9.5 g/100 g |
| Cu | 3.4 g/100 g |
| Li | 3.6 g/100 g |
| Mn | 5.8 g/100 g |
| Ni | 4.8 g/100 g |
| P | 0.36 g/100 g |

TABLE 3

Results on particle size distribution measurement of reduced mass from waste lithium ion batteries after heat treatment.

| D10 [µm] | D50 [µm] | D80 [µm] | D90 [µm] |
|---|---|---|---|
| 3.46 | 17.36 | 33.86 | 48.92 |

Example 2: a Raw Lithium Hydroxide Product in Water can be Obtained from the Material Provided in Example 1 or Example 1a Following the Process Proposed in KR101998691.

Example 2a: Leaching with Ca(OH)2

An amount of 5 g of the above-mentioned reduced battery scrap material (obtained as shown in Example 1a) is filled an a PFA flask and mixed with 5, 1.5, 1.0 and 0.5 g of solid $Ca(OH)_2$, respectively. 200 g of water are added with stirring, and the whole mixture is refluxed for 4 hours. After 4 hours, the solid content is filtrated off and filtrate samples are taken and analyzed with regard to Li, F, carbonate, OH, and Ca. Results are compiled in the below Table 4.

TABLE 4

Analyzed filtrates after Li leaching with Ca(OH)2.

| Amount of $Ca(OH)_2$ [g] | Lithium content [mg] | Fluoride content [mg] | Li leaching efficiency [%] |
|---|---|---|---|
| 0.5 | 144 | 46 | 80 |
| 1.0 | 154 | 12 | 84 |
| 1.5 | 156 | 4 | 86 |
| 5 | 162 | 4 | 90 |

Example 3: Solid LiOH from Leached Lithium Filtrate and Subsequent Re-Crystallization in Methanol Concentrated aq. solution: A filtrate obtained from a process according to example 2a is further treated according to the above described steps (e2) and (e3) to yield solid LiOH as monohydrate: 1 L of a filtrate containing 0.21 wt.-% lithium is concentrated by evaporation (40° C., 42 mbar) by a factor of 11 which is accompanied by a precipitation of finely distributed white crystals. This precipitate is filtered off.

Preparing crude solid LiOH: The remaining solution is dried applying 40° C. and a constant flow of nitrogen for 24 h. XRD shows the obtained LiOH monohydrate with minor impurities of Li2CO3. The latter is due to contact with air during almost all process steps. Tab. 5 (middle column) shows the elemental analysis including all analyzed impurities referring to LiOH*H2O. This fraction is labelled as crude LiOH*H2O.

Combining with Lower Alcohol:

3 g of this crude LiOH*H2O are dissolved in 20 g of methanol at room temperature. Remaining insoluble solids are filtered off, and 4.5 g of water are added to the clear solution. Afterwards, the liquid phase is slowly evaporated, and white crystals of LiOH*H2O are obtained. The analytical results of this purified product are shown in Tab. 5 as well (right column), both referring to LiOH*$H_2$O.

TABLE 5

Analysis of crude and purified LiOH*H2O before and after re-crystallization in methanol.

| Impurity | Crude LiOH*H2O | Purified LiOH*H2O |
|---|---|---|
| Cl | 0.36 wt % | 0.33 wt % |
| Ca | 229 wppm | 7 wppm |
| Na | 0.3 wt % | 0.3 wt |
| Al | 131 wppm | <7 wppm |
| Cu | 44 wppm | 20 wppm |
| K | 0.2 wt % | 0.2 wt % |
| Zn | 54 wppm | 26 wppm |
| F | 2286 wppm | 46 wppm |

The results show that fluoride impurities and also amphoteric elements Al and Zn are efficiently removed.

Example 4: Solid LiOH from Leached Lithium Filtrate by Fractionated Crystallization and Subsequent Re-Crystallization in Methanol Example 3 is repeated applying a fractionated crystallization in the first step: 1 L of a filtrate containing 0.21 wt.-% lithium is concentrated by evaporation (40° C., 42 mbar) by a factor of 11, which is accompanied by a precipitation of finely distributed white crystals. This precipitate is filtered off and the remaining solution is dried stepwise by applying 40° C. and 42 mbar. After further concentration by a factor of 2, the first solid fraction is filtered off. The remaining mixture is, again, concentrated by a factor of 2 and the second fraction is separated. Tab. 6 and Tab. 7 show the elemental analyses of both fractions including all analyzed impurities referring to LiOH*H2O. These fractions are labelled as $1^{st}$ or $2^{nd}$ fraction solid LiOH*H2O, respectively (medium columns).

Subsequently, both fractions are re-crystallized in methanol: Each time 2 g of the $1^{st}$ or $2^{nd}$ fraction solid LiOH*H2O are dissolved in 13 g of methanol. Remaining insoluble solids are filtered off, and 3 g of water are added to the clear filtrate. Afterwards, the liquid phase is slowly evaporated, and white crystals of LiOH*H2O are obtained. The analytical results of this purified product are shown in Tab. 6 and Tab. 7 as well (right columns).

TABLE 6

LiOH*H2O $1^{st}$ fraction and purified after additional re-crystallization in methanol

| Impurity | 1st Fraction solid LiOH*H2O | Purified LiOH*H2O |
|---|---|---|
| Cl | 0.02 wt % | 0.02 wt % |
| Ca | 97 wppm | <9 wppm |
| Na | 0.03 wt % | 0.01 wt % |
| Al | 97 wppm | <9 wppm |
| Cu | <10 wppm | <9 wppm |
| K | 0.01 wt % | 0.01 wt % |
| Zn | 97 wppm | <9 wppm |
| F | 2322 wppm | 54 wppm |
| methanol |  | wppm |

TABLE 7

LiOH*H2O 2$^{nd}$ fraction and purified after
additional re-crystallization in methanol

| Impurity | 2nd Fraction solid LiOH*H2O | Purified LiOH*H2O |
|---|---|---|
| Cl | 0.2 wt % | 0.2 wt % |
| Ca | not determined | <9 wppm |
| Na | 0.2 wt % | 0.2 wt % |
| Al | 102 wppm | <9 wppm |
| Cu | <10 wppm | <9 wppm |
| K | 0.1 wt % | 0.1 wt % |
| Zn | 71 wppm | <9 wppm |
| F | 2436 wppm | 64 wppm |
| methanol | | wppm |

Present combination of fractionated crystallization and recrystallization in methanol yields lithium hydroxide in high purity.

Example 5: Re-Crystallization in MeOH Starting with LiOH Mainly as Monohydrate (LiOH*H$_2$O)

Ca. 24 g of crude solid lithium hydroxide obtained in accordance with example 3 (mainly comprising monohydrate containing 18.2 wt.-% Li corresponding to 62.8 wt.-% LiOH approximately 37.2 wt.-% water; c(F)=0.32 wt.-%) are added to methanol (m(MeOH) as noted in Table 8 below). The solution is stirred for 16 h at ambient temperature. A cloudy solution is obtained, which is then filtrated. The filtrate is dried at 40° C. in vacuo for 12 h. The quantity of product [m(product)/g] obtained, the yield of lithium and the remaining fluoride impurity is summarized in the table below.

TABLE 8

Crude LiOH source [m(LiOH*H2O)/g] and product obtained

| | Exp. 1 | Exp. 2 | Exp. 3 | Exp. 4 | Exp. 5 |
|---|---|---|---|---|---|
| crude LiOH | 24.1 g | 24 g | 24 g | 24 g | 24.1 g |
| m(MeOH)/g | 158.0 | 164.1 | 169.9 | 184.9 | 200.1 |
| m(product)/g | 11.9 | 11.6 | 12.1 | 13.7 | 15.1 |
| Li yield/% | 75.8 | 75.8 | 79.6 | 86.2 | 93.7 |
| c(Li)/wt.-% | 28.0 | 28.5 | 28.7 | 27.4 | 27.3 |
| c(F)/wt.-% | 0.004 | 0.007 | 0.008 | 0.019 | 0.023 |
| ppm F in Li—OH*H$_2$O (calc.) | 24 | 41 | 46 | 115 | 139 |

There is a linear impact of the applied MeOH/LiOH ratio on the final fluoride content. This is due to the rather low but existing solubility of LiF in MeOH. Therefore, it is not desired to apply large amounts of MeOH. On the other hand, an increased MeOH content is beneficial for the overall lithium yield.

Example 6: Re-Crystallization in MeOH Starting with LiOH Mainly Containing Anhydrate Sequence of process steps: 1) Dissolution of solid LiOH in MeOH 2) Filtration to remove LiF 3) Addition of water 4) Drying 9.9 g of crude solid lithium hydroxide obtained in analogy with example 3 but drying at 110° C. (mainly comprising anhydrous LiOH (c(Li)=23.9 wt.-%; c(F)=0.3 wt.-%; NPOC 1739 wt.-ppm; water content approximately 17.6 wt.-%) are added to 115 g of methanol. The solution is stirred for 2 h at ambient temperature. A cloudy solution is obtained, which is then filtrated. 8.75 g of water are slowly added to the filtrate. The filtrate is then dried at 70° C. and 200 mbar for 45 min, cooled down to 45° C. at 100 mbar and finally dried for 3.5 h at 40° C. and 40 mbar. 11.6 g of product are obtained (lithium yield=96.1%). Comparison of NPOC and MeOH content (3050 wt.-ppm) gives an estimate for residual carbon which is not related to methanol. In order to reduce the MeOH content, the product is re-dissolved in water and dried again for 1 h at 70° C. Analysis of the crude solid educt material and of the dried solid products are compiled in Table 9. Assuming a constant carbon content, which is not present as methanol after this re-crystallization in water, the decrease of the NPOC content is calculated as loss of methanol. This estimate leads to 913 ppm methanol in the product after re-dissolution and re-drying which corresponds to 521 ppm methanol in ideal LiOH*H2O.

TABLE 9

Analysis of Crude LiOH and Product after Re-crystallization

| | | | F [wt.-ppm] |
|---|---|---|---|
| Crude LiOH | 23.9 | 1739 | 3000 |
| Purified LiOH | 19.6 | 1962 | 80 |
| Purified LiOH after redissolution and re-drying | 29 | 1553 | |

This example represents the most preferred way of processing since a very efficient F depletion and good yield is achieved by keeping the water content as low as possible prior to separating the undesired LiF impurity.

Example 7: Re-Crystallization in MeOH Starting with LiOH Anhydrate, No Water Addition 22.8 g of crude solid lithium hydroxide obtained in analogy with example 6 with drying at 110° C. (mainly comprising anhydrous LiOH (c(Li)=27.8 wt.-% corresponding to 95.9 wt.-% LiOH and 4.1 wt.-% water; c(F)=0.37 wt.-%) are added to 296 g of methanol. The solution is stirred for 2.5 h at ambient temperature. A cloudy solution is obtained, which is then filtrated. The filtrate is then dried at 40° C. in vacuo for 12 h. 25.5 g of product are obtained (lithium yield=90.0%). Analysis of the dried solid product is compiled in Table 10.

TABLE 10

| Element | wt.-% |
|---|---|
| Li | 22.4 |
| Total Carbon | 17.1 |
| F | 0.007 |

This example is less preferred because the product contains lithium methoxide, which self-igniting. Nevertheless, the F depletion is as effective as in example 6 since the water content is, again, as low as possible prior to separating the undesired LiF impurity.

Example 8: Re-Crystallization in MeOH, Early Water Addition

Sequence of process steps: 1) Dissolution of solid LiOH in MeOH 2) Addition of water 3) Filtration to remove LiF 4) Drying.

9.95 g of crude solid lithium hydroxide obtained in analogy to example 3 (c(Li)=23.9 wt.-% corresponding to 82.4 wt.-% LiOH and 17.6 wt.-% water; c(F)=0.3 wt.-%) are added to 116 g of methanol. The solution is stirred for 2 h at ambient temperature. 8.55 g of water are slowly added to the cloudy solution, which is then filtrated. The filtrate is dried at 70° C. and 200 mbar for 1 h, cooled down to 45° C. at 100 mbar and finally dried for 4 h at 45° C. and 45 mbar. 10.8 g of product are obtained containing 21.3 wt.-% Li and 0.012 wt.-% F (lithium yield=96.7%).

This example is less preferred than example 6 because water is added prior to separation of the undesired LiF. This additional water is capable of dissolving LiF. Therefore, F depletion is not as effective as described for the previous examples.

Example 9: Large Scale Re-Crystallization Starting with LiOH Mainly Containing Anhydrate 6.4 kg of a concentrated aqueous lithium hydroxide solution (6.2 wt.-%) obtained as described in example 3 are dried in a 0.77 l kneader-dryer. The reactor is heated to 120-135° C., the product temperature is 100-105° C. at 950 mbar. The solution is added in steps of 100 ml. The reactor is purged with 10 Nl/h Nitrogen during the whole process. The wall temperature is increased to 140-155° C. after 15 h and finally adjusted to 130-140° C. for 1 h. The product is then cooled to room temperature. The reactor is filled to 45-80% of its maximum capacity during the process. 191 g of crude solid LiOH is obtained mainly comprising anhydrous lithium hydroxide (c(Li)=27.8 wt.-% which corresponds to 95.9 wt.-% LiOH and 4.1 wt.-% water, c(F)=0.33 wt. %).

60 g of this free flowing and crystalline powder is dissolved in 800 g of methanol and stirred for 16 h. The mixture is filtrated and 100 ml of methanol is added to the filtrate. The filtrate is dried at 70° C. and 200 mbar for 1 h, cooled down to 45° C. at 100 mbar and finally dried for 4 h at 45° C. and 45 mbar. Analysis of the dried solid product is compiled in Table 11.

TABLE 11

| Element | wt.-% |
| --- | --- |
| Li | 22.4 |
| Total Carbon | 17.0 |
| F | 0.01 |

Comparative Example A: Drowning Crystallization Using MeOH

Drowning crystallization with methanol is carried out to remove impurities from the solution. Solid crude LiOH*H$_2$O recycled from Black Mass as described above in example 3 is treated in the following way: 3 g of this crude LiOH*H$_2$O is dissolved in water (20.48 g; c(Li)=15.21 wt.-%), stirred for ca. 3 hours at ambient temperature and methanol is added dropwise until formation of a solid becomes visible. In sum, an amount of 13.58 g methanol is added. Afterwards, this suspension is filtered and the clear filtrate completely dried. The dried solid residue is analyzed by elemental analysis showing a lithium content of 25.7 wt.-% and a fluoride content of 0.20 wt.-% which corresponds to a stoichiometrically ideal LiOH*H$_2$O containing 1288 ppm of fluoride. Compared with the above described examples, this comparative example applying drowning crystallization clearly underlines a less efficient fluoride removal which does not lead to the preferred fluoride content as obtainable according to the present invention. This is in accordance with the above examples showing that increased water content leads to an increased amount of LiF.

Comparative Example B: Drowning Crystallization Using Ethanol

Drowning crystallization is performed using ethanol as an antisolvent to crystallize LiOH as suggested e.g. by M. E. Taboada et al., Chem.Eng.Res.and Design 85, 1325 (2007). A concentrated, almost saturated LiOH solution as described above in example 3 (source) contains:

Lithium=2.9 wt.-% (corresponding to 10.0 wt.-% of LiOH)

Fluoride=0.026 wt.-% (corresponding to 0.15 wt.-% of fluoride impurity in LiOH*H$_2$O).

i) In a first experiment, 40 g of ethanol are added 100 g of this LiOH solution in form of 70% (wt.-%) ethanol/water. After addition of 35 g EtOH, white crystals of LiOH are observed.

ii) In a second experiment, 40 g of a liquid consisting of 90 wt.-% ethanol and 10 wt.-% water are added 100 g of this LiOH solution. After addition of 19 g EtOH, white crystals of LiOH are observed.

Each of the mixtures (i) and (ii) is stirred for 15 min. Afterwards, the precipitated salt is filtrated off, dried (3 h at 40° C. at 30 mbar) and its content of fluoride and lithium is analyzed. Fluoride content trlative to pure LiOH*H$_2$O is calculated (pure LiOH*H$_2$O contains 16.55 wt.-% Li). The results are summarized in the following Table.

TABLE

Results of drowning crystallization of LiOH using ethanol.

| Experiment | wt.-% Fluoride in solid Precipitate | wt.-% Lithium in solid Precipitate | wt.-% Fluoride in LiOH*H$_2$O (calculated) |
| --- | --- | --- | --- |
| source | | | 0.15 |
| i) | 0.21 | 14.8 | 0.23 |
| ii) | 0.17 | 14.5 | 0.19 |

Drowning crystallization with ethanol leads to a slight enrichment of fluoride in the precipitated LiOH rather than its reduction.

Figure 1:
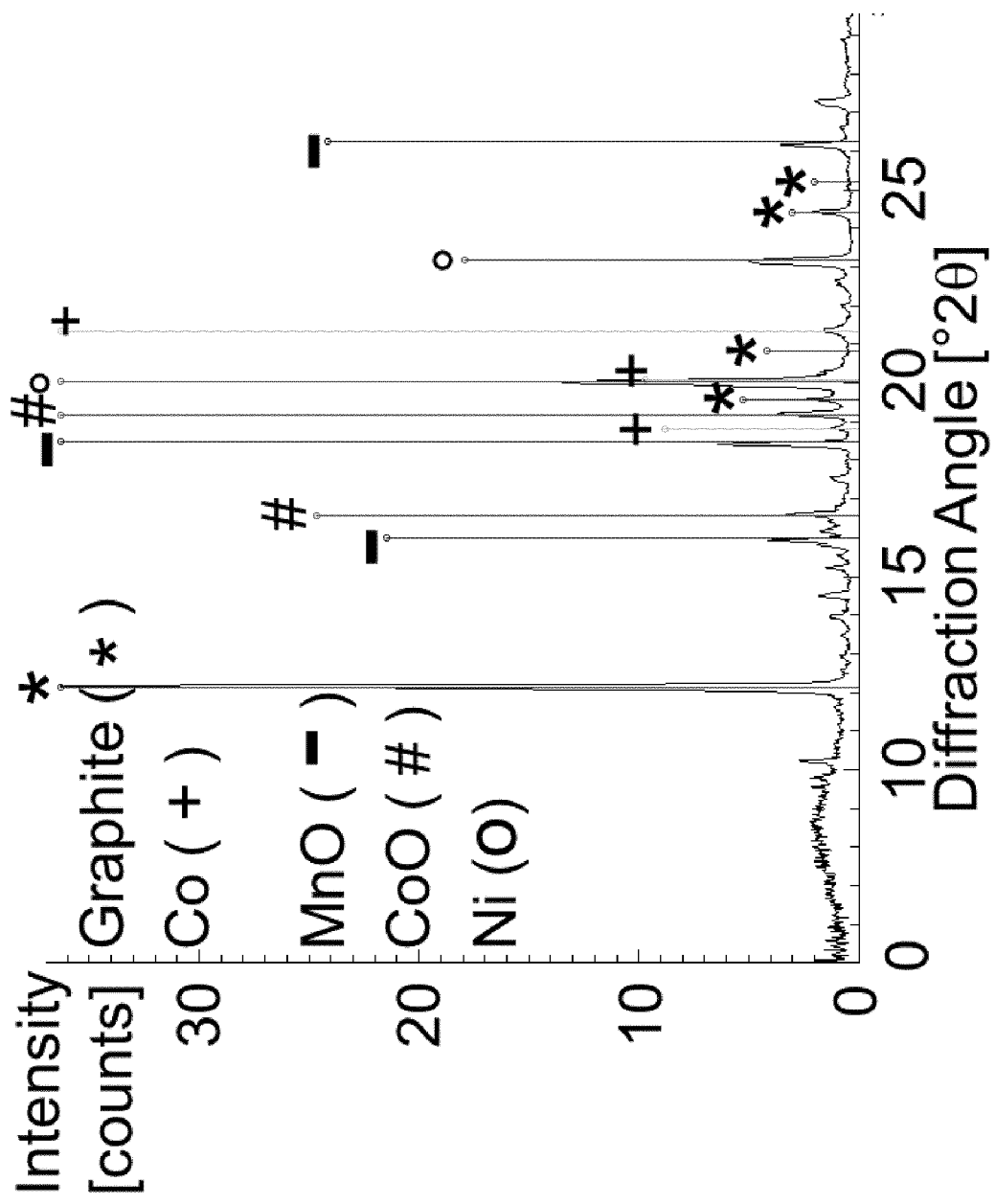
FIG. 1: X-ray powder diffractogram (Mo Ka) of reduced mass from waste lithium ion batteries after heat/reduction treatment as obtained in example 1a and used in example 2a including reference diffractograms of graphite, cobalt, manganese-II-oxide, cobalt oxide, and nickel.
Figure 2:
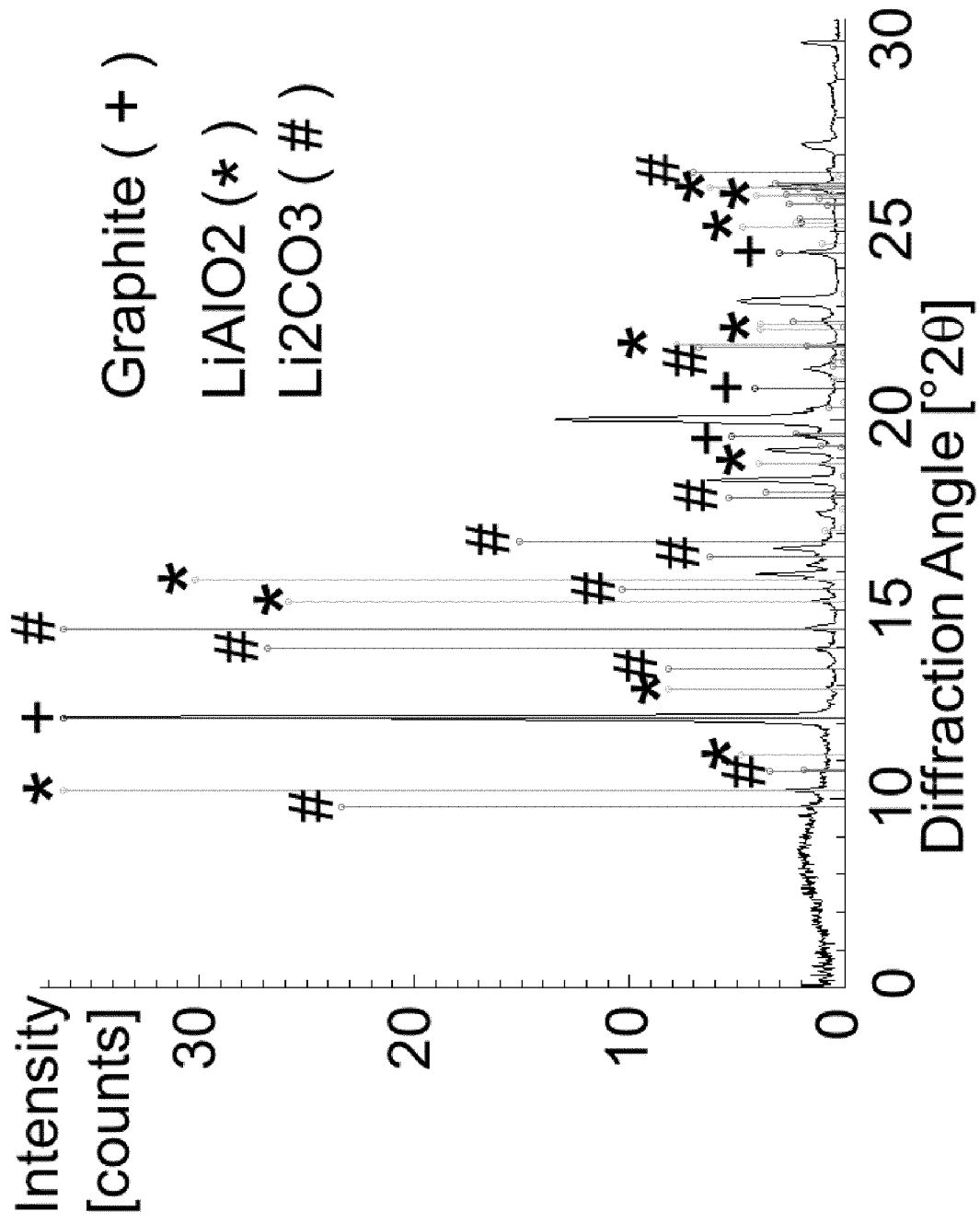
FIG. 2: X-ray powder diffractogram (Mo Ka) of reduced mass from waste lithium ion batteries after heat/reduction treatment as obtained in example 1a and used in example 2a including reference diffractograms of graphite, lithium aluminate, and lithium carbonate.
Figure 3:
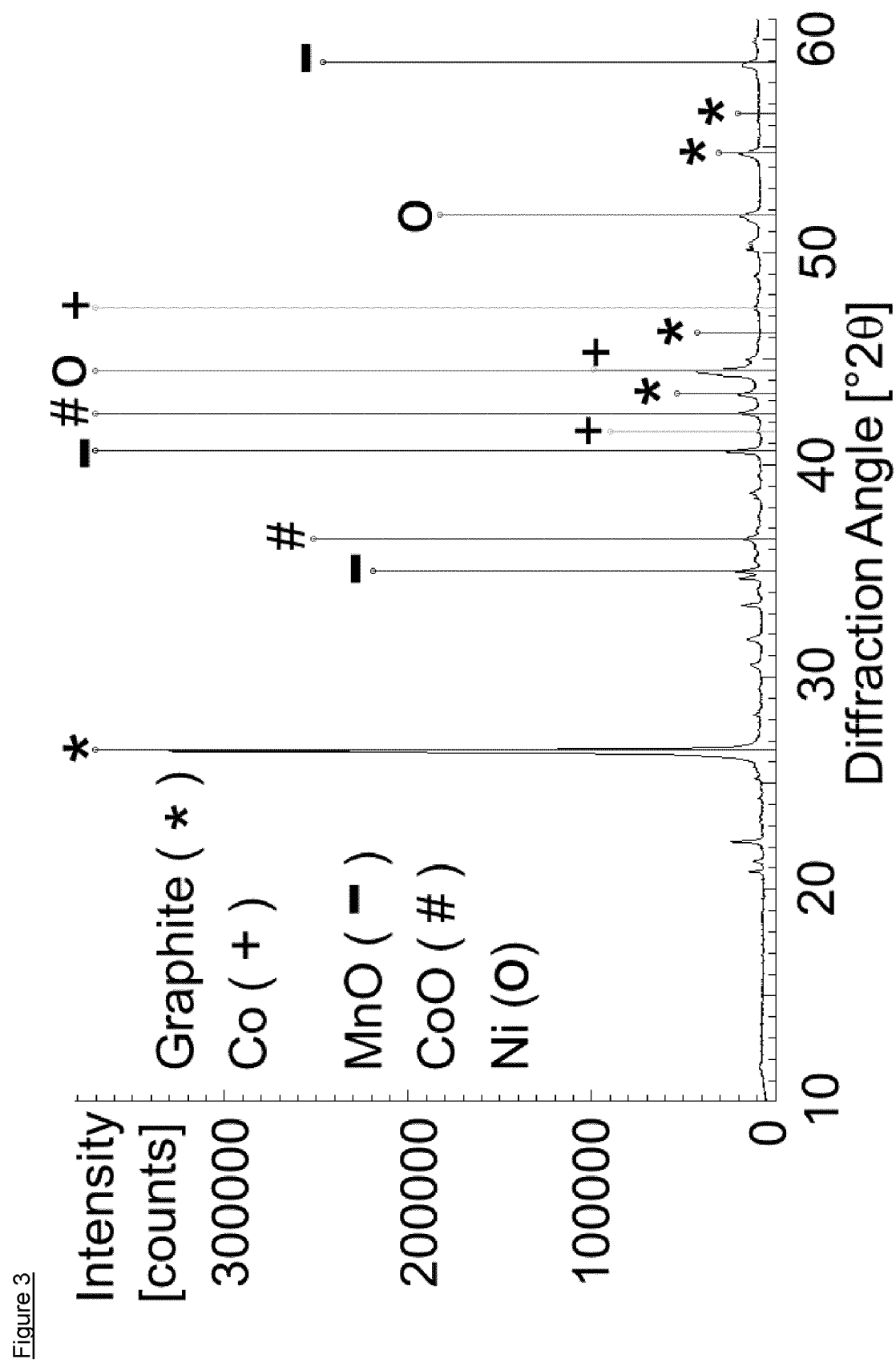
FIG. 3: X-ray powder diffractogram (Cu Ka) of reduced mass from waste lithium ion batteries after heat/reduction treatment as obtained in example 1a and used in example 2a including reference diffractograms of graphite, cobalt, manganese-II-oxide, cobalt oxide, and nickel.
Figure 4:
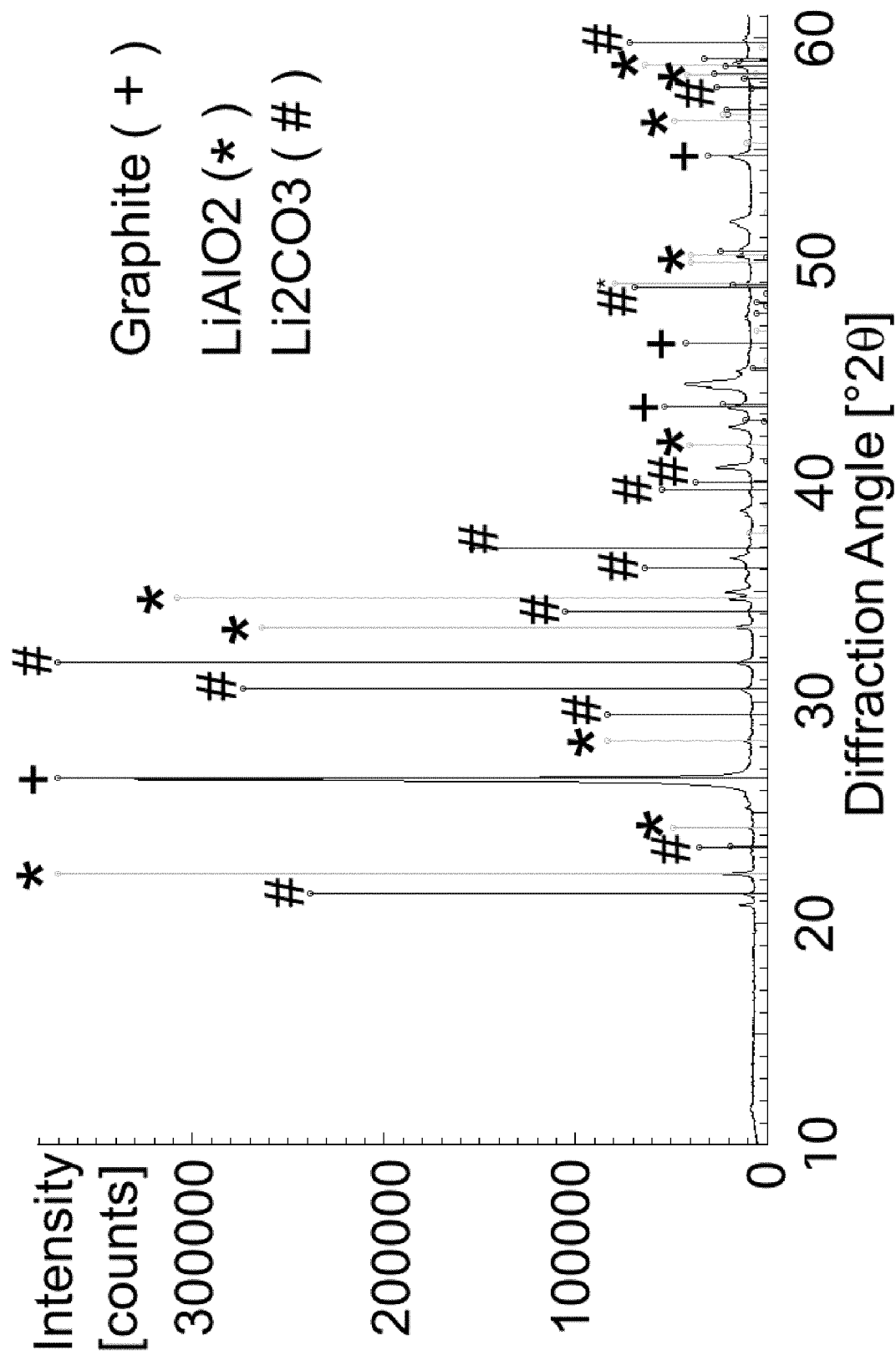
FIG. 4: X-ray powder diffractogram (Cu Ka) of reduced mass from waste lithium ion batteries after heat/reduction treatment as obtained in example 1a and used in example 2a including reference diffractograms of graphite, lithium aluminate, and lithium carbonate.

The project leading to this application has received funding from Bundesministerium für Wirtschaft and Energie (DE; FKZ:16BZF101A); the applicant bears responsibility for all disclosures herein.

The invention claimed is:

1. An electrode active material comprising
   (A) a core material according to general formula $Li_{1+x1}TM_{1-x1}O_2$, wherein TM is a combination of Ni and at least one of Mn, Co and Al, and, optionally, at least one more metal selected from Mg, Ti, Zr, Nb, Ta, and W, and x1 is in a range from −0.05 to 0.2, and
   (B) particles of cobalt compound(s), of aluminum compound(s), and of titanium compound(s) or of zirconium compound(s), wherein a molar ratio of lithium to cobalt in the particles is in a range of from zero to below 1, wherein an average oxidation state of cobalt is higher than +II and lower than +III, wherein in the particles, a molar ratio of Co to the sum of Al and Zr or Ti is in a range from 2:1 to 50:1, and wherein the particles are attached to the surface of the core material.

2. The electrode active material according to claim 1, wherein TM is a combination of metals according to general formula (I)

(I)

with
a in a range of from 0.6 to 0.95,
b in a range of from 0.025 to 0.2,
c in a range of from 0.025 to 0.2, and
d in a range of from zero to 0.1, M is selected from Al, Mg, Ti, Zr, Nb, Ta, W, and combinations of at least two of the foregoing and a+b+c=1.

3. The electrode active material according to claim 1, wherein the particles comprise cobalt oxide.

4. The electrode active material according to claim 1, wherein a weight ratio of core (A) and particles (B) ranges from 1000:1 to 1 to 1.

5. The electrode active material according to claim 1, wherein the particles (B) have an average diameter (D50) ranging from 10 nm to 10 μm.

6. A process for making the electrode active material according to claim 1, the process comprising:
   (a) providing a material according to general formula $Li_{1+x2}TM_{1-x2}O_2$, wherein TM is a combination of Ni and at least one of Mn, Co and Al, and, optionally, at least one more metal selected from Mg, Ti, Zr, Nb, Ta, and W, and $x_2$ is in a range from zero to 0.25,
   (b) contacting the material with an oxide or (oxy) hydroxide of cobalt and, at least one oxide or hydroxide or oxyhydroxide of each of Al and Ti or Zr, and
   (c) calcining the intermediate of step (b).

7. The process according to claim 6, wherein step (c) is performed at a temperature ranging from 500° C. to 850° C.

8. The process according to claim 6, wherein step (b) is performed in a mixer.

9. The process according to any of claim 6, wherein step (b) is performed by adding an aqueous slurry of an oxide or (oxy) hydroxide of cobalt and, of at least one oxide or hydroxide or oxyhydroxide of each of Al and Ti or Zr to the material provided in step (a), followed by mixing.

10. An electrode containing
    (A) at least one electrode active material according to any of claim 1,
    (B) carbon in electrically conductive form and
    (C) a binder.

11. A secondary battery containing
    (1) at least one electrode according to claim 10,
    (2) at least one anode, and
    (3) an electrolyte.

* * * * *